United States Patent
Watkins (10) Patent No.: US 6,532,741 B2
(45) Date of Patent: Mar. 18, 2003

(54) GAS GENERATOR FOR PRODUCING ADJUSTABLE FLOW

(75) Inventor: William B. Watkins, Tequesta, FL (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/896,608

(22) Filed: Jun. 29, 2001

(65) Prior Publication Data

US 2003/0000200 A1 Jan. 2, 2003

(51) Int. Cl.[7] .................................................. F02C 7/00
(52) U.S. Cl. .......................... 60/723; 60/259; 60/39.462
(58) Field of Search ...................... 60/218, 259, 39.462, 60/723

(56) References Cited

U.S. PATENT DOCUMENTS

| | | | | |
|---|---|---|---|---|
| 3,488,962 A | * | 1/1970 | McCormick | 502/302 |
| 4,731,989 A | * | 3/1988 | Furuya et al. | 431/7 |
| 5,573,736 A | | 11/1996 | Jubin, Jr. | 422/191 |
| 6,000,212 A | * | 12/1999 | Kolaczkowski et al. | 431/7 |
| H1948 H | | 3/2001 | Rusek et al. | 502/344 |

FOREIGN PATENT DOCUMENTS

| | | | |
|---|---|---|---|
| WO | WO 01/07772 A1 | 2/2001 | F02K/9/74 |
| WO | WO 01/07773 A1 | 2/2001 | F02K/9/74 |

* cited by examiner

Primary Examiner—Ehud Gartenberg
(74) Attorney, Agent, or Firm—Brian J. Hamilla (57) ABSTRACT

A gas generator, comprising a catalyst section and a mixer section. The catalyst section has openings through which a material enters and reacts with a catalyst to decompose and to produce heat. The mixer section, located downstream of the catalyst section, introduces an additional amount of the material. The heat produced in the catalyst section is sufficient to decompose the additional amount of material introduce into the mixer section without exposure to said catalyst. The catalyst bed assembly could be part of a turbopump assembly. A nozzle downstream of the mixer section directs the exhaust towards a turbine. The turbine drives a pump. The amount of material added to the mixer is selected to produce a desired amount mass flow through the nozzle. Adding material to the mixer causes the turbopump to supply more fuel or oxidizer to a rocket engine. Thus, the rocket engine is throttleable.

5 Claims, 9 Drawing Sheets

GAS GENERATOR FOR PRODUCING ADJUSTABLE FLOW

RELATED APPLICATIONS

This application is related to United States Patent Application number 09/896,355 filed on even date, herein incorporated by reference.

TECHNICAL FIELD

This invention relates to rocket engines. More particularly, this invention relates to a gas generator that can produce an adjustable flow so as to throttle the rocket engine.

BACKGROUND OF THE INVENTION

Figure 1:
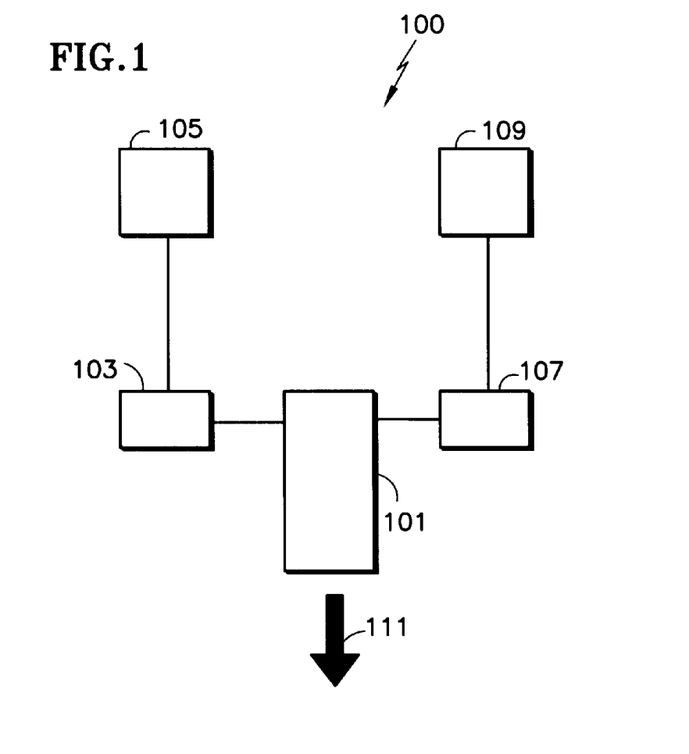
FIG. 1 is a schematic of the components of a rocket propulsion system.

FIG. 1 is a schematic of a rocket propulsion system 100. The system 100 includes a rocket engine 101. A fuel pump 103 supplies fuel to the rocket engine 101 from a fuel supply 105. Likewise, an oxidizer pump 107 supplies oxidizer to the rocket engine from an oxidizer supply 109. The rocket engine 101 combines the fuel and oxidizer, and ignites the mixture in a combustion chamber (not shown). The exhaust 111 exits a nozzle (not shown) to produce thrust.

Figure 2:
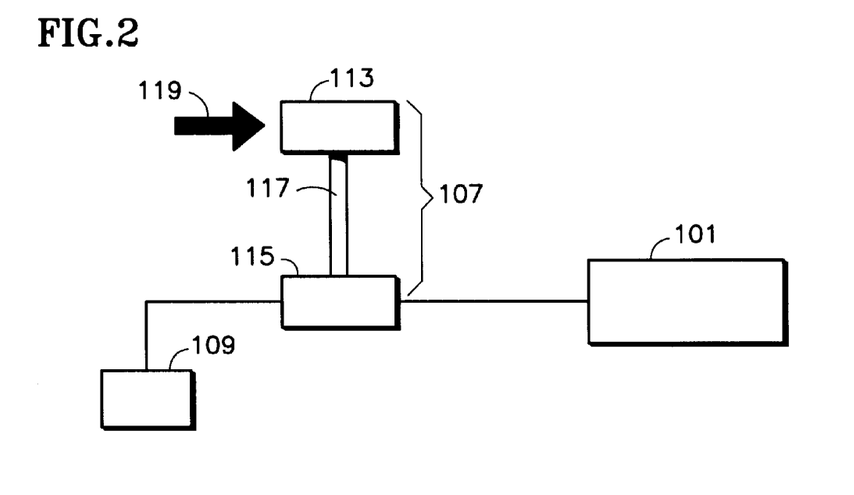
FIG. 2 is a schematic of a turbopump assembly.

To provide the amount of fuel and oxidizer required by the rocket engine 101, pumps 103, 107 are preferably turbopumps. FIG. 2 is a schematic of a turbopump assembly 107. Generally speaking, the turbopump assembly 107 includes a turbine 113 connected to an impeller 115 by a shaft 117. The turbine 113 converts the kinetic energy from an exhaust stream 119 into shaft horsepower to drive the impeller 115. The impeller 115 transports the oxidizer from the supply 109 to the rocket engine 101. Turbopump 103 for the fuel operates in a similar manner, and is not described in further detail.

In conventional operations, the turbopumps 103, 107 provide a constant supply of oxidizer and fuel to the rocket engine 101. This uniform supply of oxidizer and fuel by the turbopumps 103, 107 produces a constant thrust in the rocket engine 101.

DISCLOSURE OF THE INVENTION

It is an object of the present invention to provide a rocket engine having adjustable thrust.

It is a further object of the present invention to provide a turbopump assembly that can adjust the thrust of a rocket engine.

It is a further object of the present invention to provide a turbopump assembly having a gas generator having a mixer section that can adjust output flow.

It is a further object of the present invention to provide a gas generator with a catalyst bed section that decomposes a material upon exposure to a catalyst and a mixer section that decomposes the material without exposure to a catalyst.

It is a further object of the present invention to provide a gas generator with a catalyst bed section that decomposes a material upon exposure to a catalyst and a mixer section that thermally decomposes a material without exposure to a catalyst.

It is a further object of the present invention to provide a gas generator having a catalyst bed assembly and which bypasses a portion of a material around the catalyst bed section for cooling.

These and other objects of the present invention are achieved in one aspect by a gas generator. The gas generator comprises: a catalyst section including openings through which a material enters and reacts with a catalyst to decompose and to produce heat; and a mixer section downstream of the catalyst section, the mixer section introducing an additional amount of the material. The heat produced in the catalyst section is sufficient to decompose the additional amount of the material without exposure to the catalyst.

These and other objects of the present invention are achieved in another aspect by a turbopump assembly. The turbopump assembly comprises: a catalyst bed for decomposing a material to produce a discharge; a mixer section downstream of the catalyst bed for introducing an additional amount of the material to the discharge to produce an exhaust stream having a mass flow; a nozzle downstream of the mixer section; a turbine downstream of the nozzle; and a pump driven by the turbine. The additional amount of the material is selected to produce a desired amount of mass flow.

These and other objects of the present invention are achieved in another aspect by a method of throttling a rocket engine. The method comprises the steps of: providing a catalyst bed; introducing an amount of a material into the catalyst bed so that the catalyst bed decomposes the material to produce a discharge; and selectively adding an additional amount of the material into the discharge to produce an exhaust stream having a mass flow. The additional amount of material increases the mass flow of the exhaust stream.

BRIEF DESCRIPTION OF THE DRAWINGS

Other uses and advantages of the present invention will become apparent to those skilled in the art upon reference to the specification and the drawings, in which.

BEST MODE FOR CARRYING OUT THE INVENTION

Figure 3:
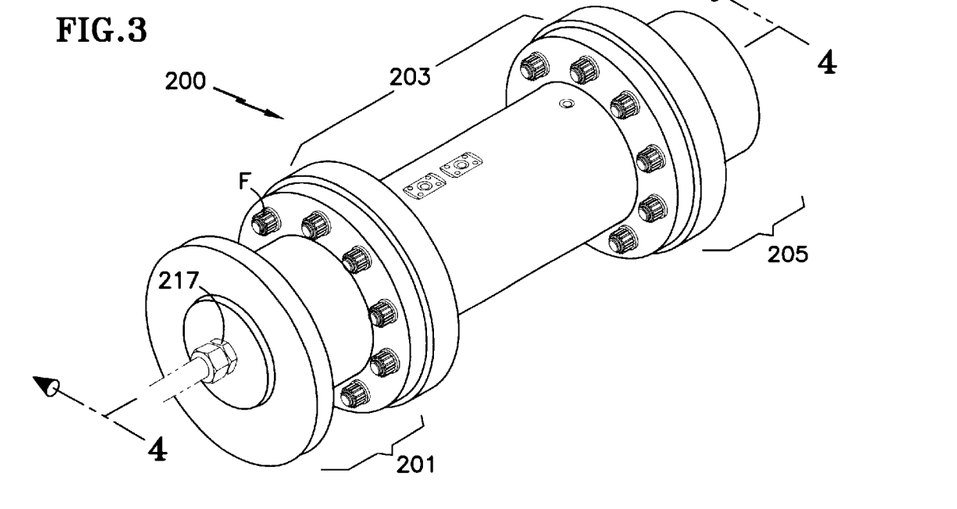
FIG. 3 is a perspective view of a partially assembled gas generator of the present invention.

FIG. 3 is a perspective view of a partially assembled gas generator 200 of the present invention. The gas generator 200 includes several sections. Starting from the upstream end, the gas generator 200 has a catalyst bed section 201, a mixer section 203 and a nozzle section 205. Fasteners F can secure the various sections 201, 203, 205 of the gas generator 200 together in a conventional manner.

Figure 4:
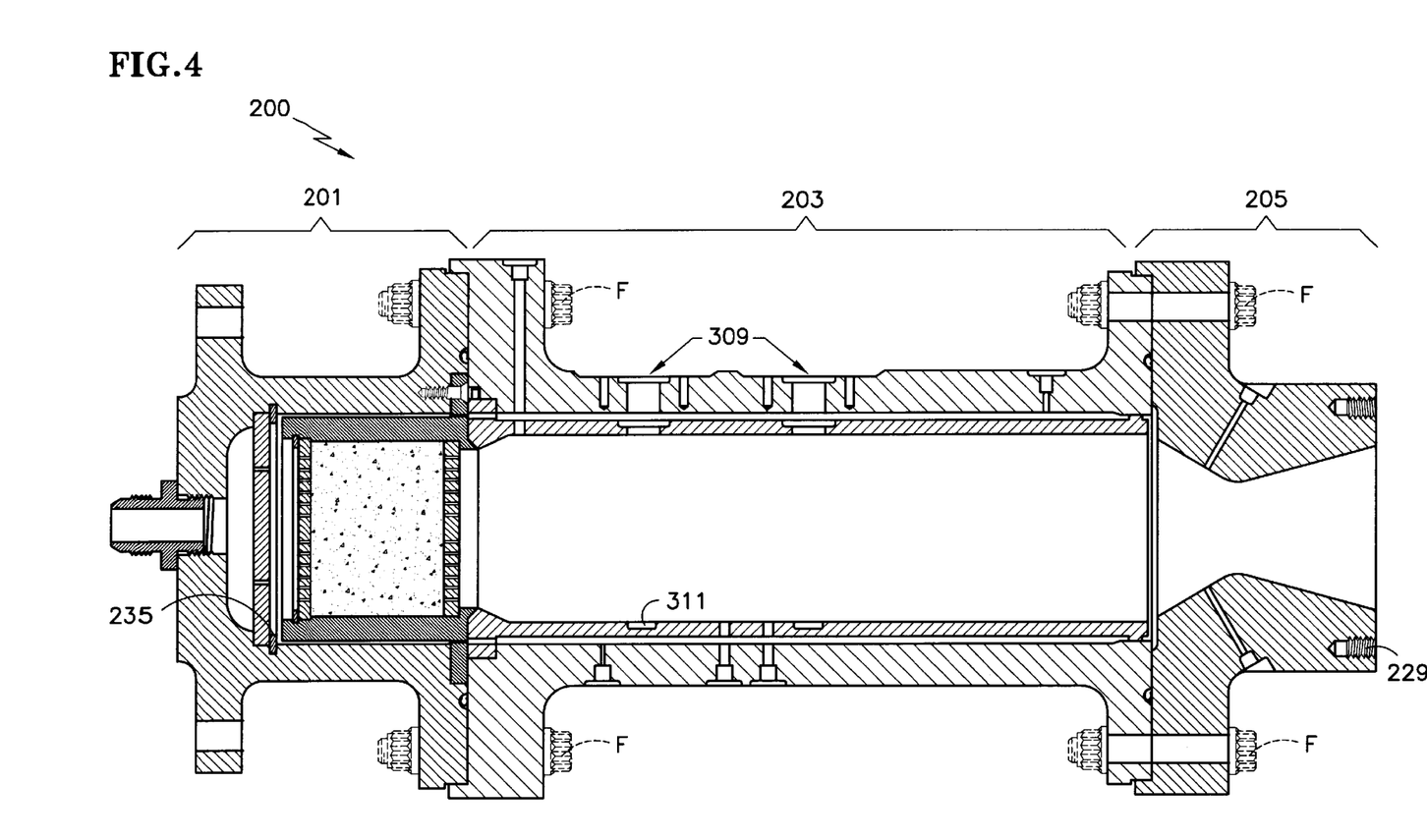
FIG. 4 is a cross-sectional view of the gas generator of FIG. 3 taken along line IV—IV.

FIG. 4 displays a cross-sectional view of the gas generator 200. Generally speaking, the catalyst bed section 201 decomposes a highly concentrated (e.g. 98 wt-%) hydrogen peroxide using a catalyst material. The mixer section 203 receives the discharge from the catalyst bed section 201, namely water vapor, oxygen and heat. The mixer section 203 introduces a selected additional amount of hydrogen peroxide to the discharge. This additional hydrogen peroxide decomposes without exposure to the catalyst material, i.e. due to the temperature of the discharge. The nozzle 205 receives the discharge from the mixer 203 to produce an exhaust stream. The additional hydrogen peroxide injected into the mixer 203 augments the discharge from the catalyst bed section 201. The amount of additional hydrogen peroxide used is selected to produce a desired mass flow of the exhaust stream. Each section of the gas generator 200 will now be described in greater detail.

As seen in FIG. 4, the nozzle section 205 resides at the downstream, or outlet, end of the mixer 203. The nozzle 205 receives the output from the mixer 203, and accelerates the output from the mixer 203 to form the exhaust stream 119. As described earlier, the exhaust stream 119 leaving nozzle 205 can drive the turbine 113 in the turbopump 107. Although shown as a convergent-divergent nozzle, the present invention could use any suitable nozzle arrangement.

The nozzle 205 can have threaded openings 229 for securing to the turbopump 107. Also, the nozzle 205 could be made from any suitable material, such as a high temperature, non-catalytic aerospace alloy.

Figure 5:
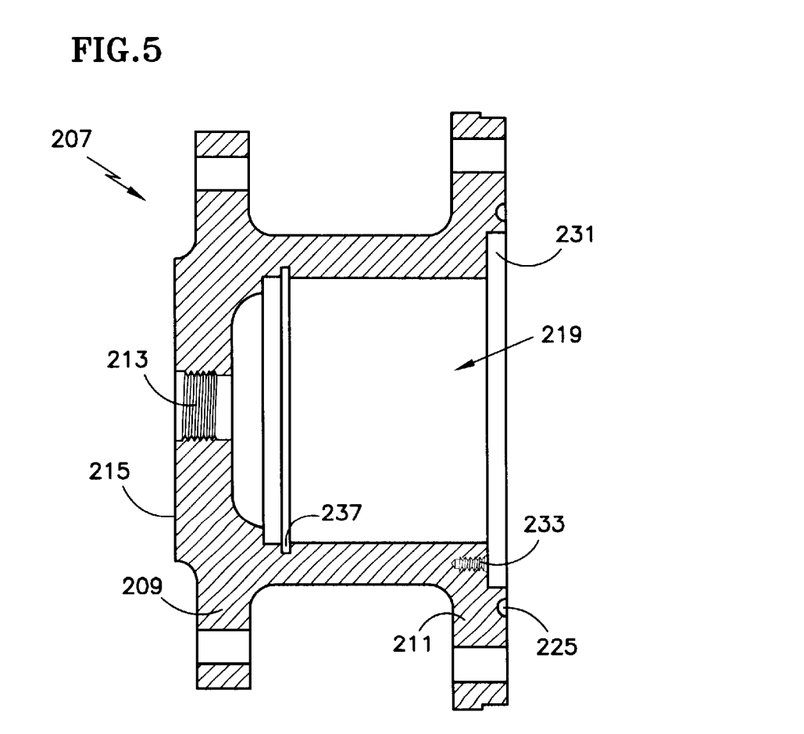
FIG. 5 is a cross-sectional view of the outer housing of the catalyst bed section.

The catalyst bed section 201 includes a catalyst can 221 within an outer housing 207. As seen in FIG. 5, the outer housing 207 can be a cylindrical pipe having flanges 209, 211 to secure the catalyst bed section 201 to other components. However, other arrangements are possible. Outer housing 207 could be made from any suitable material, such as a high temperature, non-catalytic aerospace alloy.

The outer housing 207 secures to mixer 203 using fasteners F. As seen in FIG. 5, flange 211 includes an annular groove 225 within which a C-shaped (in cross-section) annular metal seal 227 resides. The seal 227 keeps the decomposed hydrogen peroxide from escaping from the joint between the catalyst bed section 201 and the mixer 203. Although described as a metallic C-shaped annular seal, any suitable seal or sealing arrangement could be used.

The outer housing 207 includes a threaded opening 213 in a front face 215. The opening receives a correspondingly threaded coupling 217 to create an inlet. The coupling 217 secures to a pipe (shown in phantom in FIG. 3) supplying liquid hydrogen peroxide to the gas generator 200.

The outer housing 207 includes an open interior 219. The open interior 219 has a suitable size to receive a catalyst can 221. As seen in FIG. 5, the outer housing 207 has an annular shoulder 231 in which a portion of the catalyst can 221 rests. The outer housing 207 also has at least one threaded opening 233 for securing the catalyst can 221 on the shoulder 231 with a suitable fastener (not shown).

Figure 6:
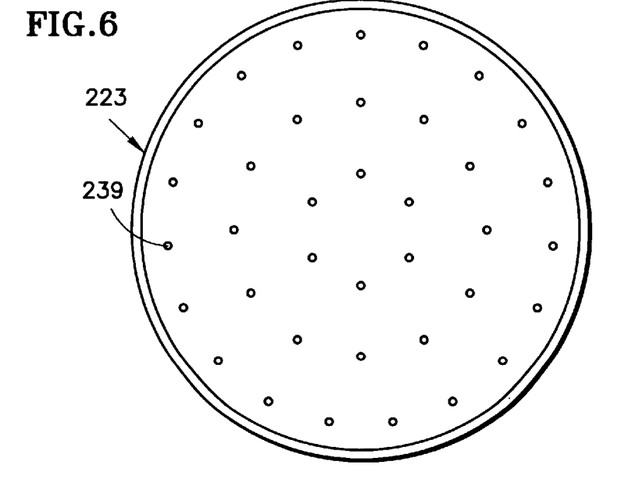
FIGS. 6, 9 and 10 are front views of pressure baffles used in the catalyst bed assembly of FIG. 3.

A first pressure baffle 223 resides within the open interior 219 of the outer housing 207. The pressure baffle 223 is preferably made from a high temperature, non-catalytic aerospace alloy. As seen in FIG. 6, the baffle 223 has an array of openings 239 therethrough. Preferably, the baffle 223 has an outer diameter of approximately 3.96" and the openings 239 have a diameter of approximately 0.063". However, other sizes, numbers and arrangements of the apertures could be used to achieve a suitable result. A ring 235 placed in an annular groove 237 on the inner surface of the outer housing 207 retains the pressure baffle 223 within the outer housing 207.

The baffle 223 reduces the pressure of the liquid hydrogen peroxide in the direction of flow. In other words, the pressure of the hydrogen peroxide downstream of the baffle 223 is less than the pressure of the hydrogen peroxide upstream of the baffle.

Although the decomposition of the hydrogen peroxide in the catalyst can 221 produces a temperature of approximately 2192° R, neither the outer housing 207, the mixer 203 nor the nozzle 205 require any external cooling lines. Rather, the present invention uses bypass hydrogen peroxide (i.e. hydrogen peroxide that does not enter the catalyst can 221) to travel within the gas generator 200 and to cool the catalyst bed section 201, the mixer 203 and the nozzle 205. In the catalyst bed section, a gap 263 exists between the catalyst can 221 and the outer housing 207. The gap 263 allows some hydrogen peroxide to bypass the interior of the catalyst can 221. Similar passageways exist in the mixer 203. These features are described in more detail below.

Figure 7:
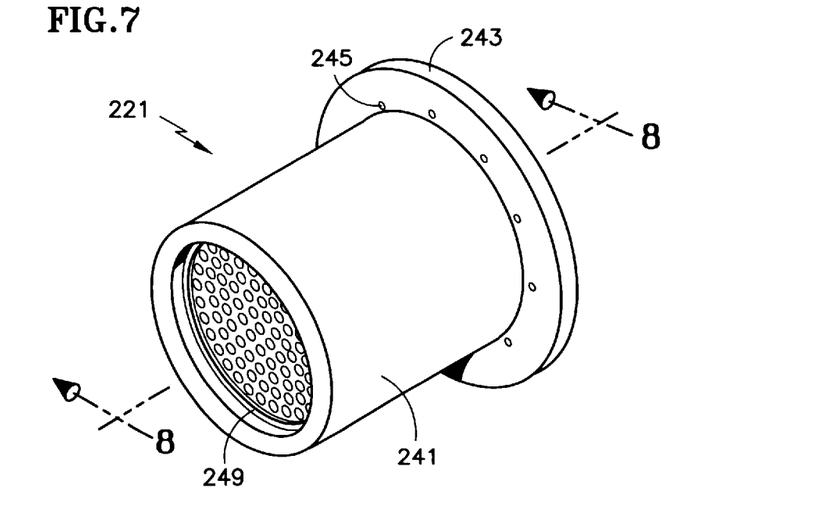
FIG. 7 is a perspective view of the catalyst can of the catalyst bed section.
Figure 8:
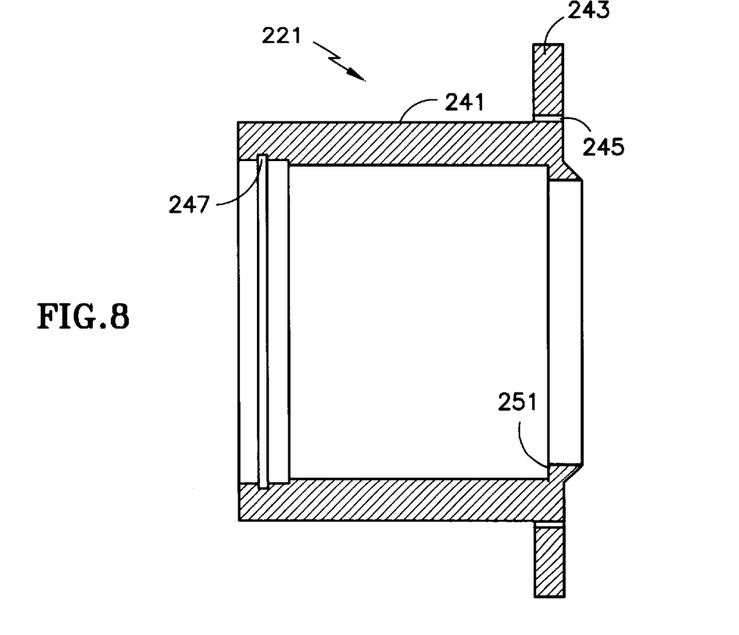
FIG. 8 is a cross-sectional view of the catalyst can of FIG. 7 taken along line VIII—VIII.

FIGS. 7 and 8 display the catalyst can 221. The catalyst can 221 is preferably made from a suitable material, such as a high temperature, non-catalytic aerospace alloy. The catalyst can 221 has a cylindrical outer wall 241 with a flange 243. The flange 243 includes a plurality of apertures 245. Preferably, the flange 243 includes 12 equally spaced apertures 245, each having a diameter of 0.050". Again, the size, number and arrangement of apertures could be adjusted to achieve a desired result. The apertures 245 are in communication with the gap 263 between the catalyst can 221 and the outer housing 207 to allow the bypass hydrogen peroxide to flow towards the mixer section 203.

The interior of the catalyst can 221 has an annular groove 247 adjacent the upstream end. As seen in FIGS. 4 and 7, the groove 247 receives a metal ring 249. The downstream end of the catalyst can 221 includes an annular shoulder 251. As seen in FIG. 4, the contents within the catalyst can 221 are retained between the metal ring 249 and the shoulder 251.

Figure 9:
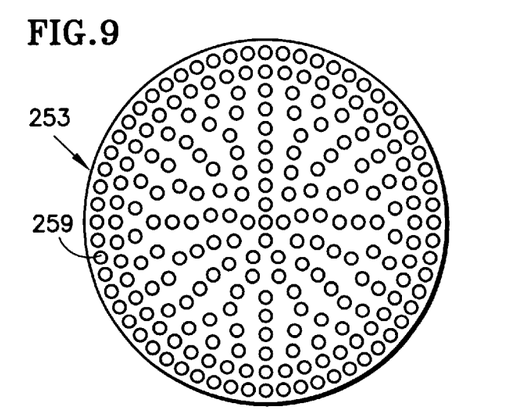

The contents of the catalyst can 221 include a second pressure baffle 253, a third pressure baffle 255, and catalyst material 257. The second pressure baffle 253 is located adjacent the ring 249. The second pressure baffle 253 is also preferably made from a high temperature, non-catalytic aerospace alloy. As seen in FIG. 9, the baffle 253 has an array of openings 259 therethrough. Preferably, the baffle 253 has an outer diameter of approximately 2.70" and the openings 259 have a diameter of approximately 0.093". However, other sizes, numbers and arrangements of the apertures 259 could be used to achieve a suitable result.

The ring 249 placed in the annular groove 247 retains the pressure baffle 253 in the catalyst can 221. The baffle 253 serves to reduce the pressure of the liquid hydrogen peroxide in the direction of flow. In other words, the pressure of the hydrogen peroxide downstream of the baffle 253 is less than the pressure of the hydrogen peroxide upstream of the baffle.

Figure 10:
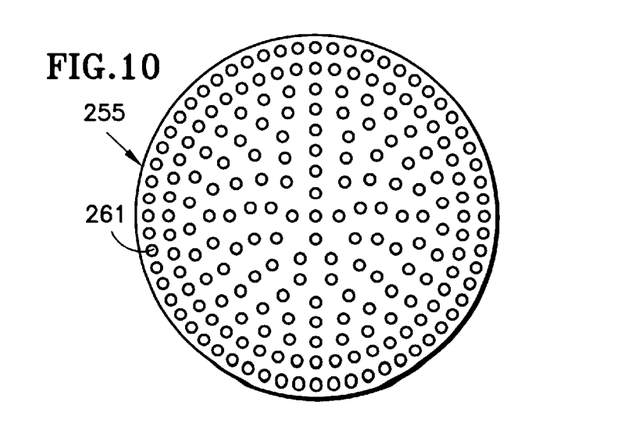

The third pressure baffle 255 rests against the shoulder 251. The third pressure baffle 255 is also preferably made from a high temperature, non-catalytic aerospace alloy. As seen in FIG. 10, the baffle 255 has an array of openings 261 therethrough. Preferably, the baffle 255 has an outer diameter of approximately 2.70" and the openings 261 have a diameter of approximately 0.078". However, other sizes, numbers and arrangements of the apertures 261 could be used to achieve a suitable result.

The catalyst material 257 resides between the second pressure baffle 253 and the third pressure baffle 255. Preferably, the catalyst material 257 comprises a bed of silver alloy. However, any catalyst that is useful in decomposing the hydrogen peroxide could be used.

The assembly of the catalyst can 221 will now be described with reference to FIGS. 4, 5 and 7. First, the third pressure baffle 255 is seated on the shoulder 251 of the catalyst can 221. Next, the catalyst material 257 is placed into the catalyst can 221. Then, the second pressure baffle 253 is placed into the catalyst can. Finally, the ring 249 is seated into the groove 247 of the catalyst can. The catalyst can 221 is now fully assembled.

Before the catalyst can 221 is placed into the outer housing 207, the first pressure baffle 223 is placed in the upstream end of the open interior 219 of the outer housing 207 and secured with the ring 235. The catalyst can 221 is then placed into the open interior 219 of the outer housing 207. The flange 243 of the catalyst can rest on the shoulder 231 of the outer housing 207. To ensure suitable retention, the catalyst can 221 can be secured to the outer housing 207 using suitable fasteners (not shown). Finally, the coupling 217 is secured to the opening 213 in the front face 215 of the outer housing 207. The catalyst bed section 201 is now fully assembled.

Figure 11:
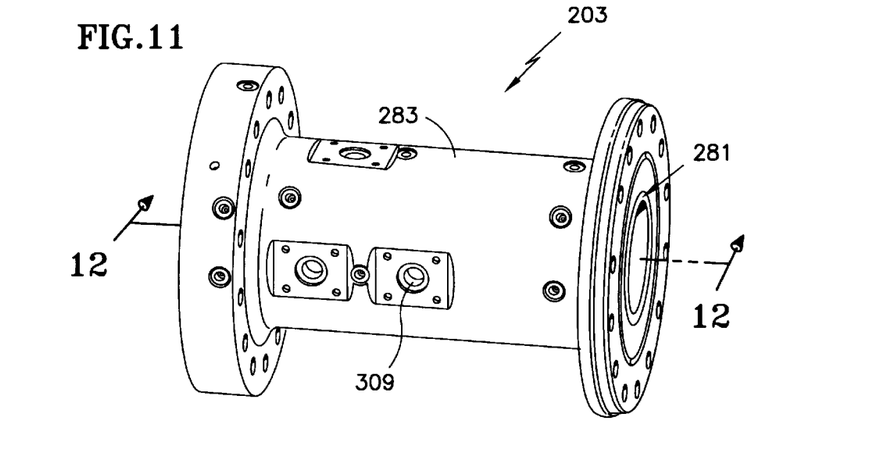
FIG. 11 is a perspective view of the mixer section.

The catalyst bed section 201 preferably receives a uniform supply of liquid hydrogen peroxide to produce a constant discharge. Specifically, the supply pipe has a diameter of approximately 3" and supplies approximately 4–8 pounds per second of liquid hydrogen peroxide at a temperature of approximately 100° F. The catalyst bed section 201 decomposes the liquid hydrogen peroxide to produce a discharge. The mixer 203 receives this discharge, comprising water vapor and oxygen at approximately 750 psi and 2192° R FIG. 11 shows a perspective view of the mixer 203. The mixer 203 includes an inner housing 281 located within an outer housing 283. Both the inner housing 281 and the outer housing 283 are made from a suitable material, such as a high temperature, non-catalytic aerospace alloy.

Figure 12A:
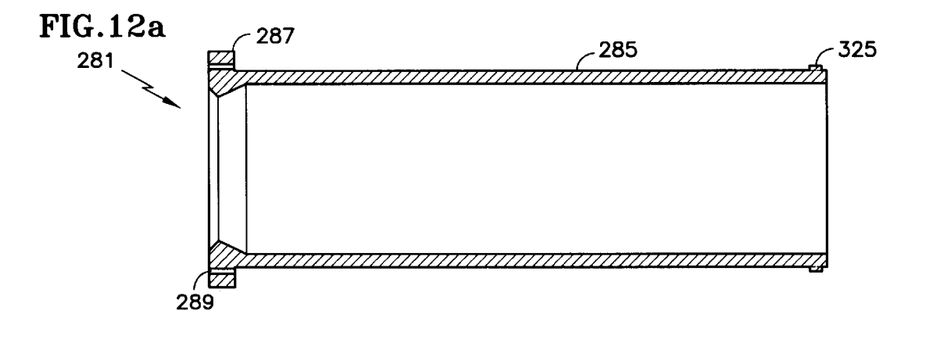
FIGS. 12a and 12b are cross-sectional views of the components of the mixer section of FIG. 11 taken along line XII—XII.

FIG. 12a displays a cross-sectional view of the inner housing 281. The inner housing 281 has a cylindrical body 285 with a flange 287 at one end. The flange 287 includes a plurality of apertures 289. The apertures 289 preferably align with the apertures 245 on the flange 243 of the catalyst can 221 to form a passageway for the bypass hydrogen peroxide. To align with the apertures 245, the flange 287 should have 12 equally spaced apertures 289, each having a diameter of 0.050". Again, the size, number and arrangement of the apertures 289 could be adjusted to achieve the desired cooling of the mixer 203 by the bypass hydrogen peroxide. This feature will be explained in more detail below.

As seen in FIG. 12a, a plurality of fins 325 extend from the outer diameter of the inner housing 281. The fins 325 abut the inner diameter of the outer housing 283 to align the inner housing 281 relative to the outer housing 283. This creates a gap 303 between the remainder of the inner housing 281 and the outer housing 283. The gap 303 allows the bypass hydrogen peroxide to flow between the inner housing 281 and the outer housing 283 of the mixer 203 for cooling. Since the fins 325 are circumferentially spaced from each other along the outer diameter of the inner housing 281, the bypass hydrogen peroxide can pass between adjacent fins 325 to exit towards the nozzle 205.

Figure 12B:
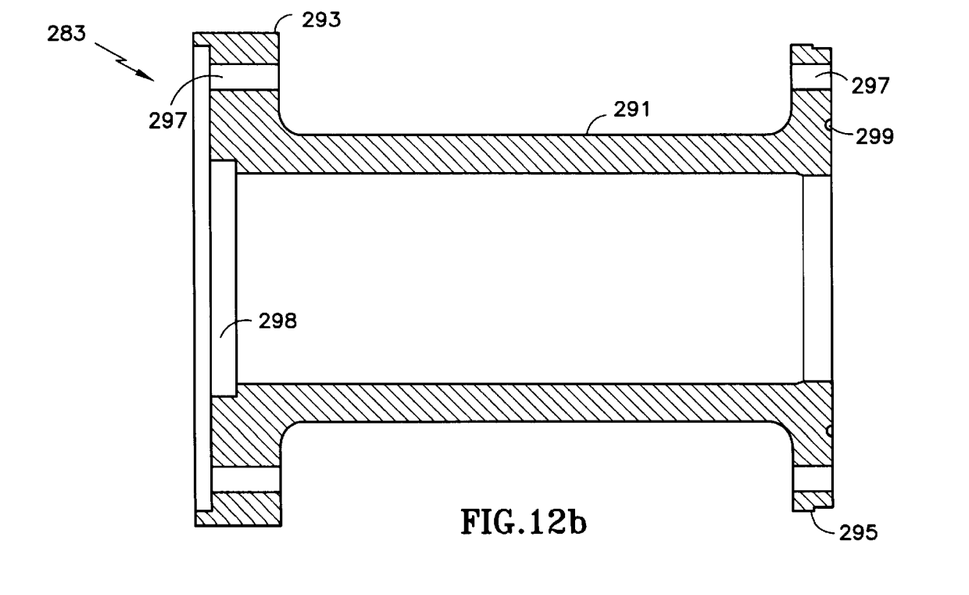

FIG. 12b displays a cross-sectional view of the outer housing 283. The outer housing 283 has a cylindrical body 291 with a flange 293 at one end and a flange 295 at the opposite end. The flanges 293, 295 include openings 297 for the fasteners F used to secure the sections 201, 203, 205 together. The one end of the outer housing 283 has a recess 298 that receives the flange 287 of the inner housing 281. The other end of the outer housing 283 includes a groove 299 that receives a seal 301 positioned between the mixer 203 and the nozzle 205. As described earlier, the seal 301 could be a C-shaped annular metal seal, or any other suitable seal.

Figure 13:
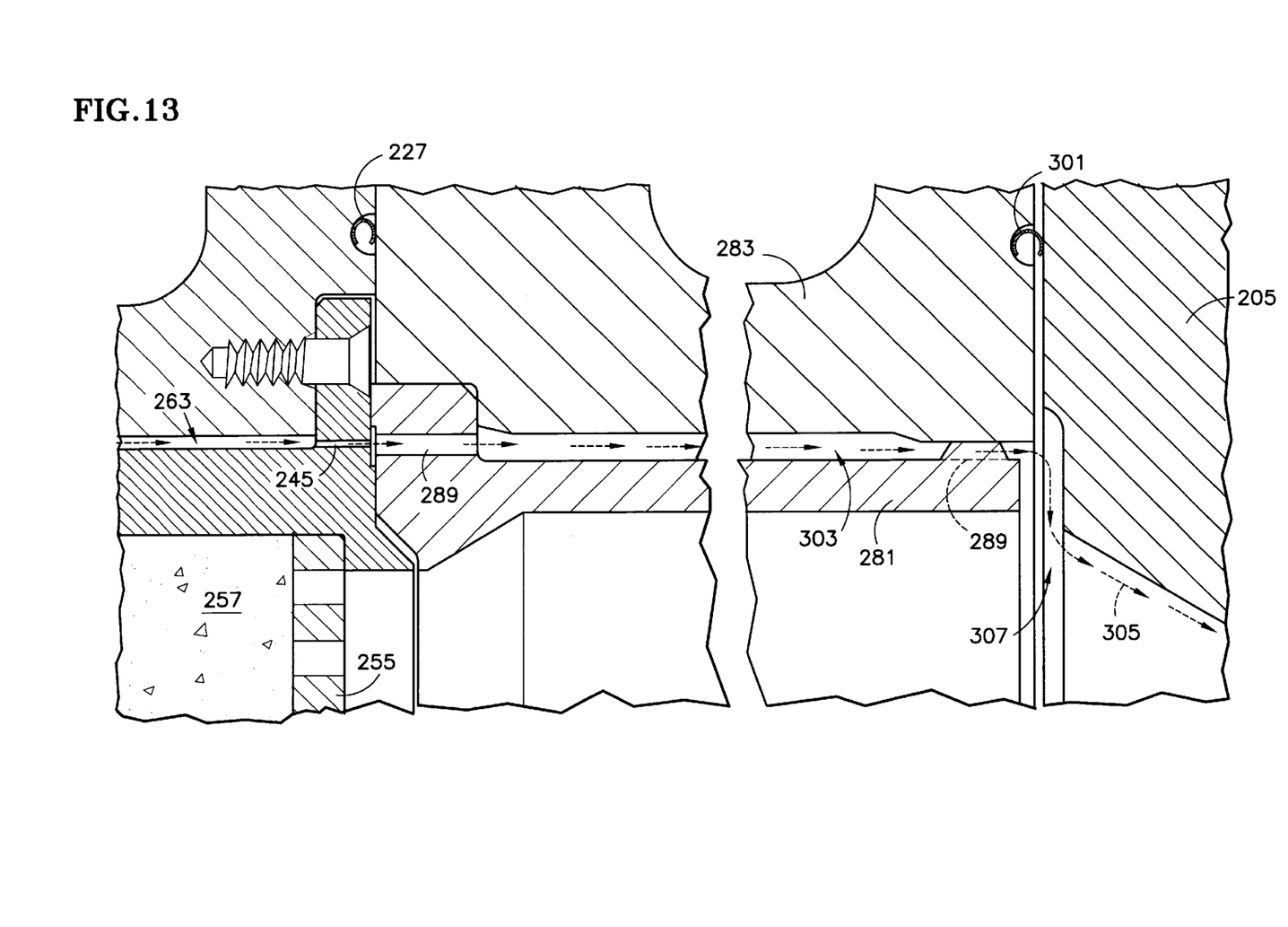
FIG. 13 is a detailed cross-sectional view of the gas generator of FIG. 4.

FIG. 13 shows the inner housing 281 positioned within the outer housing 283 (and with the sections 201, 203, 205 secured together). The figure also clearly shows a path 305 (shown in dashed line) taken by the liquid bypass hydrogen peroxide. Specifically, the path 305 of the bypass hydrogen peroxide begins in the gap 263 between the catalyst can 221 and the outer housing 207 of the catalyst bed section 201. The bypass hydrogen peroxide then travels through the apertures 245 in the flange 243 of the catalyst can 221 and into the apertures 289 in the flange 287 of the inner housing 281. The bypass hydrogen peroxide then enters the gap 303 between the inner housing 281 and the outer housing 283 and past the fins 325 on the inner housing 281 to exit the mixer 203.

Since the nozzle 205 is likewise exposed to the heat created by the decomposition of the hydrogen peroxide in the catalyst can 221, heat build-up in the nozzle 205 must also be controlled. Similar to the annular gap 263 in the catalyst bed section and the annular gap 303 in the mixer 203, a gap 307 exists between the nozzle 205 and the catalyst can 221 downstream of the catalyst can 221. The bypass hydrogen peroxide travels along this gap 307 and into the interior section of the nozzle 205 where it merges with the decomposed hydrogen peroxide. Preferably, the liquid bypass hydrogen peroxide provides film cooling along the inner diameter of the nozzle 205.

Preferably, approximately 95 percent of the hydrogen peroxide introduced through coupling 217 and into the catalyst bed 201 enters the catalyst can 221. This portion of the hydrogen peroxide undergoes decomposition by the catalyst material 257.

The remaining 5 percent of the hydrogen peroxide bypasses around the catalyst can 221 and does not contact the catalyst material 257. As discussed above, this remainder of the liquid hydrogen peroxide is used to cool the gas generator 200. Although a 5 percent bypass percentage is discussed, any suitable percentage could be used. The amount of bypass could be controlled by the size of the annular gaps 263, 265, the gap 307, or by the number and the size of the apertures 245, 289 or fins 325.

The main purpose of the mixer 203 is to augment the constant discharge from the catalyst bed section 201 with a selected amount of additional mass flow. This additional amount increases the exhaust stream exiting the nozzle 205. Since the gas generator 200 is preferably part of a turbopump assembly, the turbine converts the increased mass flow of the exhaust stream into additional torque to drive the impeller. The increased torque on the impeller increases the supply of either the oxidizer or the fuel to the rocket engine. The increased supply of fuel or oxidizer to the rocket engine increases thrust. In other words, the mixer section 203 can be used to throttle the rocket engine.

To achieve this result, FIGS. 4 and 11 show the mixer 203 with openings 309 through the inner housing 281 and the outer housing 283. Opposite each opening 309, the inner housing 281 includes a recess 311. Each opening 309 and corresponding recess 311 receives a spray bar assembly 313.

The spray bar assemblies 313 inject liquid hydrogen peroxide into the discharge within the inner housing 281 of the mixer 203. Due to the temperature of the discharge 2192° R), the injected liquid hydrogen peroxide will decompose merely upon exposure to the discharge. In other words, the injected liquid hydrogen peroxide decomposes even without exposure to the catalyst material 257 in the catalyst bed section 201.

Figure 15:
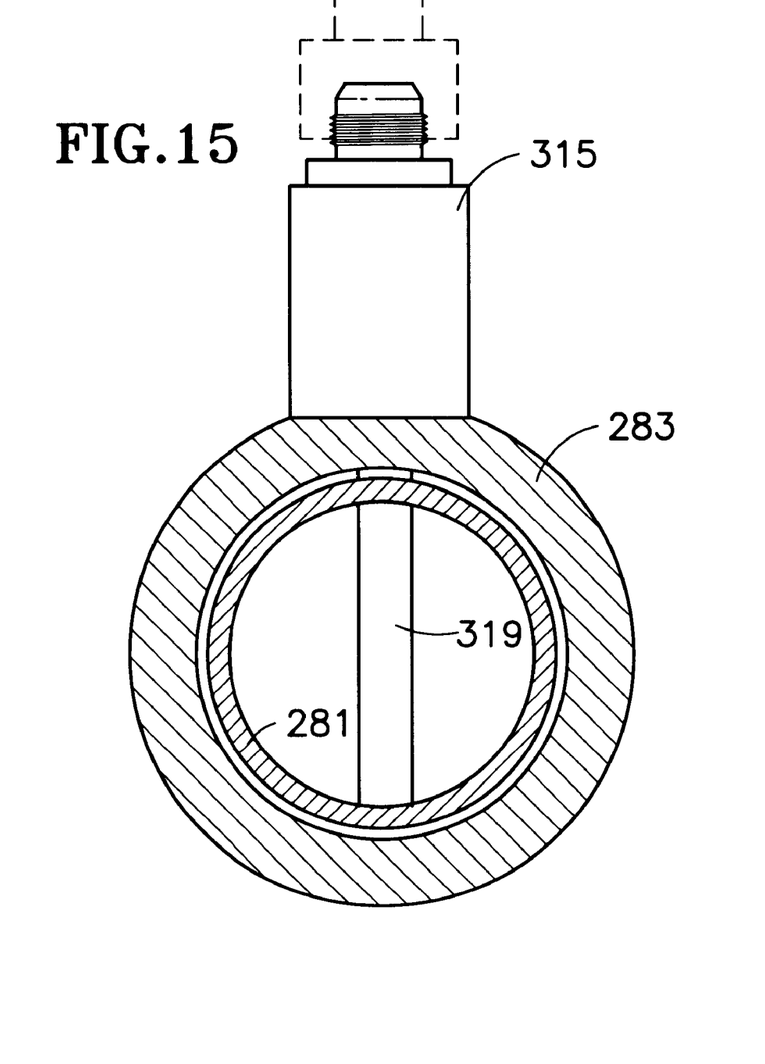
FIG. 15 is a cross-sectional view of the gas generator of FIG. 14 taken along line XV—XV.

Although FIG. 11 displays that the mixer 203 could receive three spray bar assemblies 313, any number is possible. In addition, although FIG. 15 displays the spray bar assemblies centrally located within the mixer, the position of the spray bar assemblies 313 could be adjusted to achieved a desired result.

The spray bar assembly 313 includes a body 315 secured to the mixer 203 and a coupling 317 threaded into the body 315. The coupling 317 receives a pipe (shown in phantom in FIG. 14) supplying hydrogen peroxide to the mixer 203. The spray bar assembly 313 also includes a tube 319. Preferably, the tube 319 is made from a suitable high temperature, non-catalytic aerospace alloy and has a diameter of approximately 0.500", although any suitable size could be used.

Figure 14:
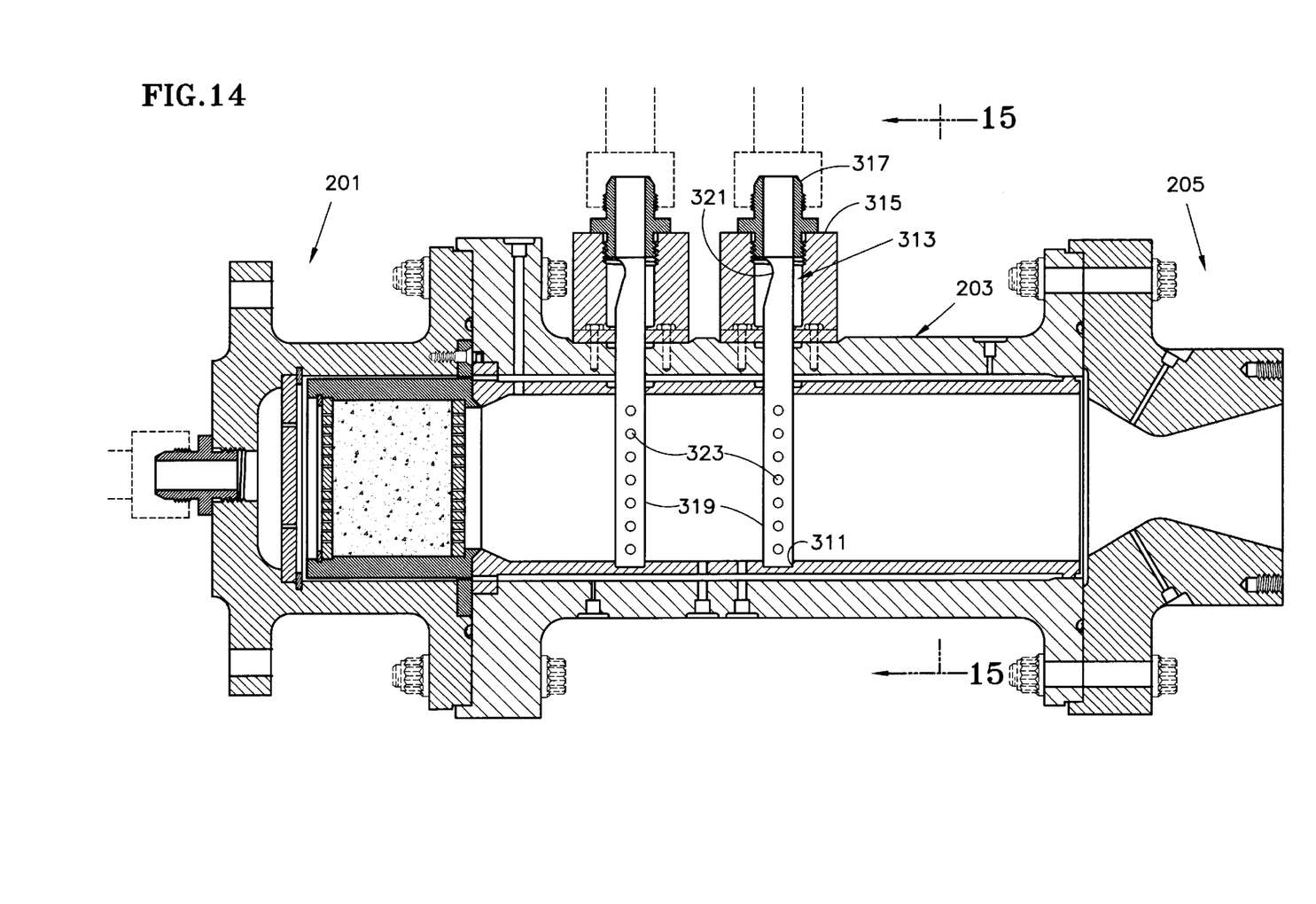
FIG. 14 is a cross-sectional view of a fully assembled gas generator.

The tube 319 has one end 321 located within the body 315. The tube 319 has ports 323 arrayed along the other end located within mixer 203. Preferably, the ports 323 have a diameter of approximately 0.040". A pump (not shown) can be used to inject the liquid hydrogen peroxide into the mixer 203. The liquid hydrogen peroxide travels from the pipe, into the body 315, down the tube 319 and through the ports 323 into the mixer 203. Although the spray bar assembly 313 has been described as using a pump, any other mechanism (e.g. a venturi tube) could be used to inject the hydrogen peroxide into the mixer 203.

Preferably, the amount of liquid hydrogen peroxide supplied to the spray bar assemblies 313 is selected to achieve a desired mass flow of the exhaust stream exiting the nozzle 205. For example, each spray bar assembly could inject approximately 4 pounds per second of hydrogen peroxide at approximately 750 psi into the mixer 203. The hydrogen peroxide supplied to the mixer 203 could be from the same source as the hydrogen peroxide supplied to the catalyst bed section 201. Other arrangements, such as discrete sources, could be used.

FIG. 11 shows various other openings in the mixer 203 that receive conventional thermocouples (not shown) to sense the temperature within the gas generator 200. These conventional features will not be discussed in further detail.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A gas generator, comprising:

a catalyst section, said catalyst section including openings through which a material enters and reacts with a catalyst to decompose and to produce heat; and a mixer section downstream of said catalyst section, said mixer section introducing an additional amount of said material;

wherein said heat produced in said catalyst section is sufficient to decompose said additional amount of said material without exposure to said catalyst.

2. The gas generator as recited in claim 1, wherein said material is hydrogen peroxide.

3. The gas generator as recited in claim 1, further comprising a nozzle downstream of said mixer section.

4. The gas generator as recited in claim 1, wherein said additional amount also cools said catalyst section.

5. The gas generator of claim 1, wherein said gas generator is part of a turbopump assembly.

* * * * *